(12) United States Patent
Mizuno et al.

(10) Patent No.: US 8,746,681 B2
(45) Date of Patent: Jun. 10, 2014

(54) SHEET FEEDERS

(75) Inventors: Masatsugu Mizuno, Ama (JP); Kouji Watanabe, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/431,192

(22) Filed: Mar. 27, 2012

(65) Prior Publication Data

US 2013/0056924 A1    Mar. 7, 2013

(30) Foreign Application Priority Data

Sep. 7, 2011    (JP) .................................. 2011-195174

(51) Int. Cl.
    *B65H 1/00*    (2006.01)
(52) U.S. Cl.
    USPC .......... 271/145; 399/393; 399/377; D14/453; D14/422
(58) Field of Classification Search
    USPC .......... 271/145, 162; 399/377, 393; D14/453, D14/422
    See application file for complete search history.

(56) References Cited

U.S. PATENT DOCUMENTS

| | | | |
|---|---|---|---|
| D610,148 S * | 2/2010 | Kuroda et al. | D14/422 |
| D610,149 S * | 2/2010 | Kuroda et al. | D14/422 |
| D610,153 S * | 2/2010 | Kuroda et al. | D14/453 |
| D610,154 S * | 2/2010 | Kuroda et al. | D14/453 |
| 7,677,556 B2 * | 3/2010 | Murayama et al. | 271/162 |
| 8,330,998 B2 * | 12/2012 | Yoshida et al. | 358/474 |
| 2005/0094227 A1 * | 5/2005 | Hwang et al. | 358/498 |
| 2007/0222143 A1 * | 9/2007 | Murayama et al. | 271/278 |
| 2010/0053701 A1 | 3/2010 | Yoshida et al. | |
| 2010/0060948 A1 | 3/2010 | Yoshida et al. | |

FOREIGN PATENT DOCUMENTS

| | | |
|---|---|---|
| JP | 2010-062839 | 3/2010 |
| JP | 2010-068336 | 3/2010 |

* cited by examiner

*Primary Examiner* — Luis A Gonzalez
(74) *Attorney, Agent, or Firm* — Banner & Witcoff, Ltd.

(57) ABSTRACT

A sheet feeder is provided that includes a housing, a feed tray having a loading surface, and a swingable opening cover including a sliding contact portion, extending in a direction perpendicular to a width direction of a sheet. The sliding contact portion is configured to slide in contact with a feed tray in a swing motion of the feed tray from a first position where the loading surface is directed downward above the housing to a second position where the loading surface is directed upward at an upstream side relative to the housing in a feeding direction. The sliding contact portion is disposed on at least one end of the opening cover in the width direction, and exposed to an outside of the sheet feeder when the feed tray is in the first position.

12 Claims, 10 Drawing Sheets

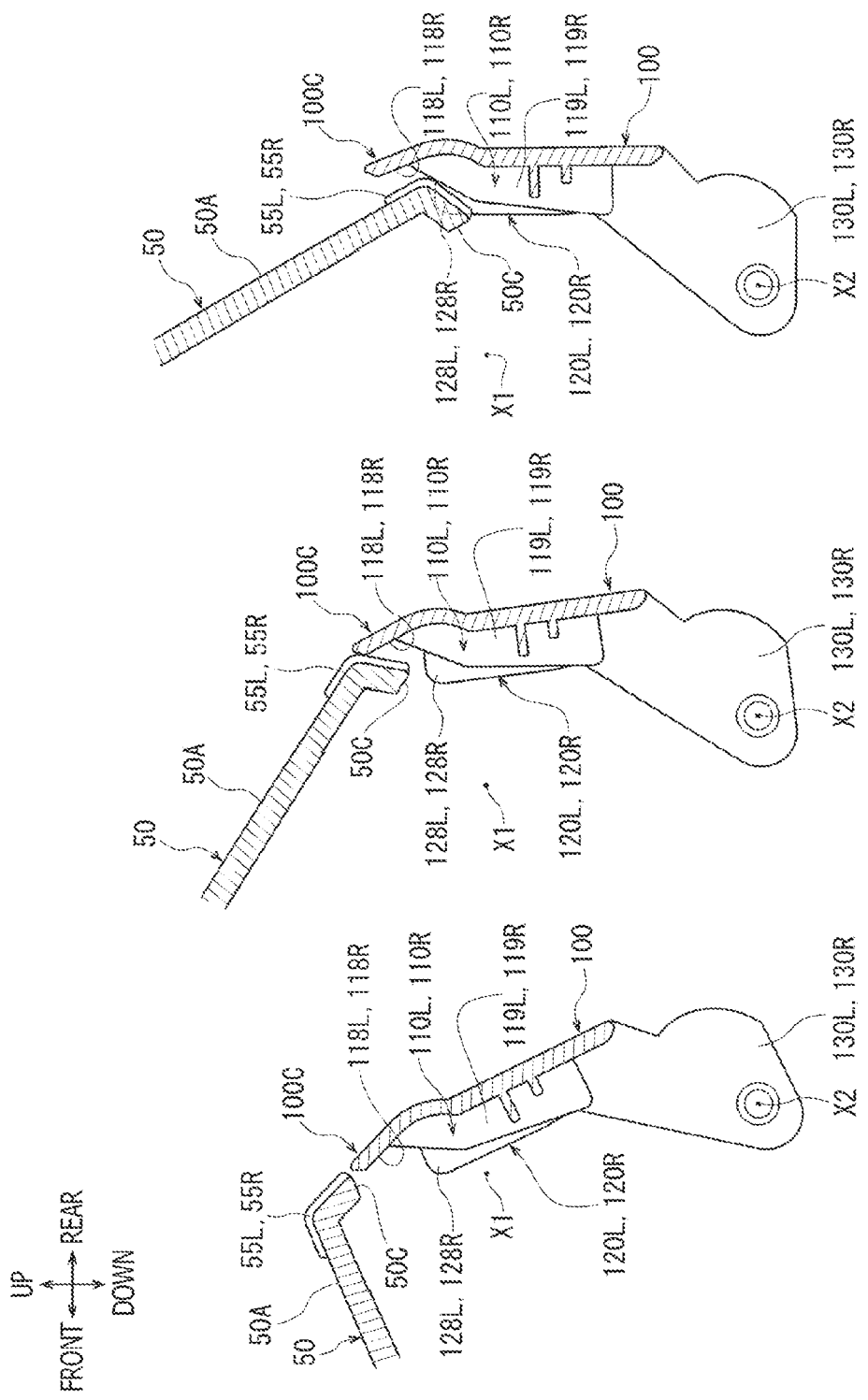

SHEET FEEDERS

CROSS-REFERENCE TO RELATED APPLICATION

This application claims priority under 35 U.S.C. §119 from Japanese Patent Application No. 2011-195174 filed on Sep. 7, 2011. The entire subject matter of the application is incorporated herein by reference.

BACKGROUND

1. Technical Field

The following description relates to one or more sheet feeders.

2. Related Art

A sheet feeder configured to feed a sheet has been known, which includes a housing, a feed tray, an opening, and an opening cover. The feed tray is formed in a flat plate shape having a loading surface on which there is placed a stack of sheets to be fed into the housing along a feeding direction. Further, the feed tray is swingable around a first swing axis parallel to the width direction of the sheets to be fed, between a closed position where the loading surface is directed downward above the housing and an open position where the loading surface is directed upward at an upstream side relative to the housing in the feeding direction. The opening is formed when an end of the housing that is located on a side close to the first swing axis is separated from an end of the feed tray that is located on a side close to the first swing axis in a state where the feed tray is in the closed position. The opening cover is configured to swing around a second swing axis parallel to the first swing axis and to cover the opening when the feed tray in the closed position.

SUMMARY

There are cases where the known sheet feeder is configured such that the opening cover includes first sliding contact portions that slide in contact with the feed tray in an earlier process of a swing motion of the feed tray from the closed position to the open position, and second sliding contact portions that slide in contact with the feed tray in a later process of the swing motion. By the sliding contacts of the first sliding contact portions and the second sliding contact portions, the opening cover is swung in conjunction with the swing motion of the feed tray. The second sliding contact portions are configured to be covered with exterior covers (such as side covers) and housed in the housing when the feed tray is in the closed position. Therefore, the known sheet feeder needs a space to accommodate the second sliding contact portions inside the housing. Thus, it leads to a problem that it is hard to downsize the sheet feeder since the sheet feeder needs to be designed to be longer in the width direction.

Aspects of the disclosure are advantageous to provide one or more improved techniques for a sheet feeder that make it possible to downsize the sheet feeder.

According to aspects of the disclosure, a sheet feeder is provided that includes a housing, a feed tray including a loading surface configured such that a sheet to be fed into the housing along a feeding direction is placed thereon, the feed tray being formed in a flat plate shape and configured to swing around a first swing axis parallel to a width direction of the sheet between a first position where the loading surface is directed downward above the housing and a second position where the loading surface is directed upward at an upstream side relative to the housing in the feeding direction, an opening formed by an end of the housing on a side close to the first swing axis being separated from an end of the feed tray on a side close to the first swing axis in a state where the feed tray is in the first position, and an opening cover configured to swing around a second swing axis parallel to the first swing axis, the opening cover being configured to cover the opening when the feed tray is in the first position. The opening cover includes a sliding contact portion disposed on at least one end of the opening cover in the width direction, the sliding contact portion extending in a direction perpendicular to the width direction, the sliding contact portion being exposed to an outside of the sheet feeder when the feed tray is in the first position, the sliding contact portion being configured to slide in contact with the feed tray in a swing motion of the feed tray from the first position to the second position.

According to aspects of the disclosure, further provided is a sheet feeder configured to feed a sheet along a feeding direction, the sheet feeder including a housing, an opening formed at an end of the housing in the feeding direction, and an opening cover configured to swing around a swing axis parallel to a width direction of the sheet between a first position where the opening cover is close to the housing so as to cover the opening and a second position where the opening cover is separated from the housing, the opening cover including a sliding contact portion disposed on at least one end of the opening cover in the width direction, the sliding contact portion extending in a direction perpendicular to the width direction, the sliding contact portion being exposed to an outside of the sheet feeder when the opening cover is in the first position, the sliding contact portion being configured to slide in contact with the feed tray in a swing motion of the feed tray from the first position to the second position.

BRIEF DESCRIPTION OF THE ACCOMPANYING DRAWINGS

FIG. 14A is a cross-sectional side view schematically showing the region around the opening cover in the state shown in FIG. 8 in the embodiment according to one or more aspects of the disclosure.

FIG. 14B is a cross-sectional side view schematically showing the region around the opening cover in the state shown in FIG. 9 in the embodiment according to one or more aspects of the disclosure.

FIG. 14C is a cross-sectional side view schematically showing the region around the opening cover in the state shown in FIG. 10 in the embodiment according to one or more aspects of the disclosure.

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an embodiment according to aspects of the disclosure will be described with reference to the accompanying drawings.

(Embodiment)

In the following description, the front side, the rear side, the left side, the right side, the upside, and the downside of an image reader 1 of the embodiment will be defined as shown in the accompanying drawings.

<Overall Configuration>

Figure 3:
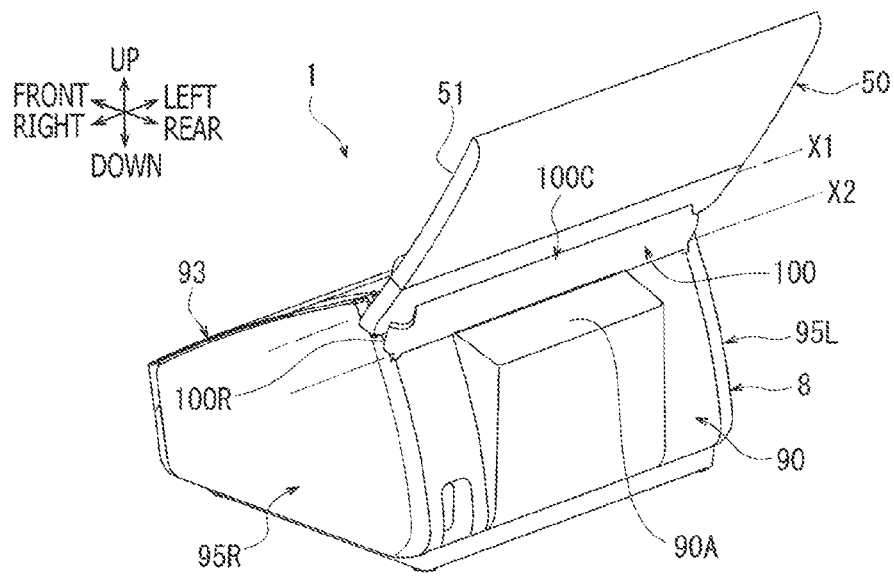
FIG. 3 is a perspective view mainly showing the rear side of the image reader in a state where the feed tray is in an open position in the embodiment according to one or more aspects of the disclosure.
Figure 4:
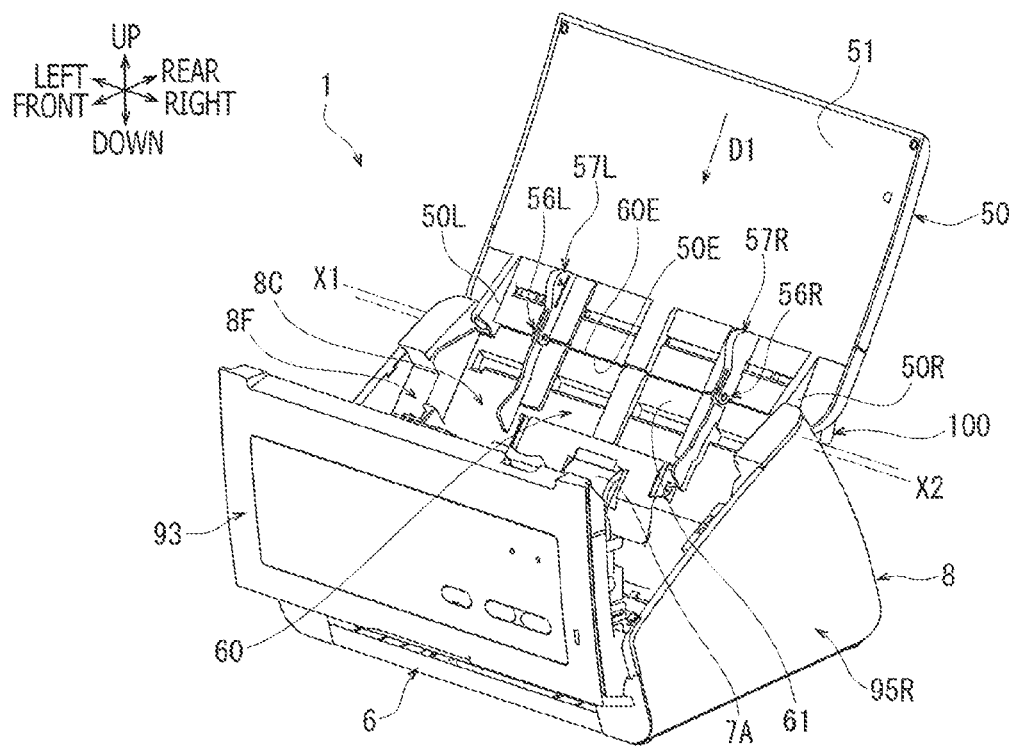
FIG. 4 is a perspective view mainly showing the front side of the image reader in the state where the feed tray is in the open position in the embodiment according to one or more aspects of the disclosure.
Figure 5:
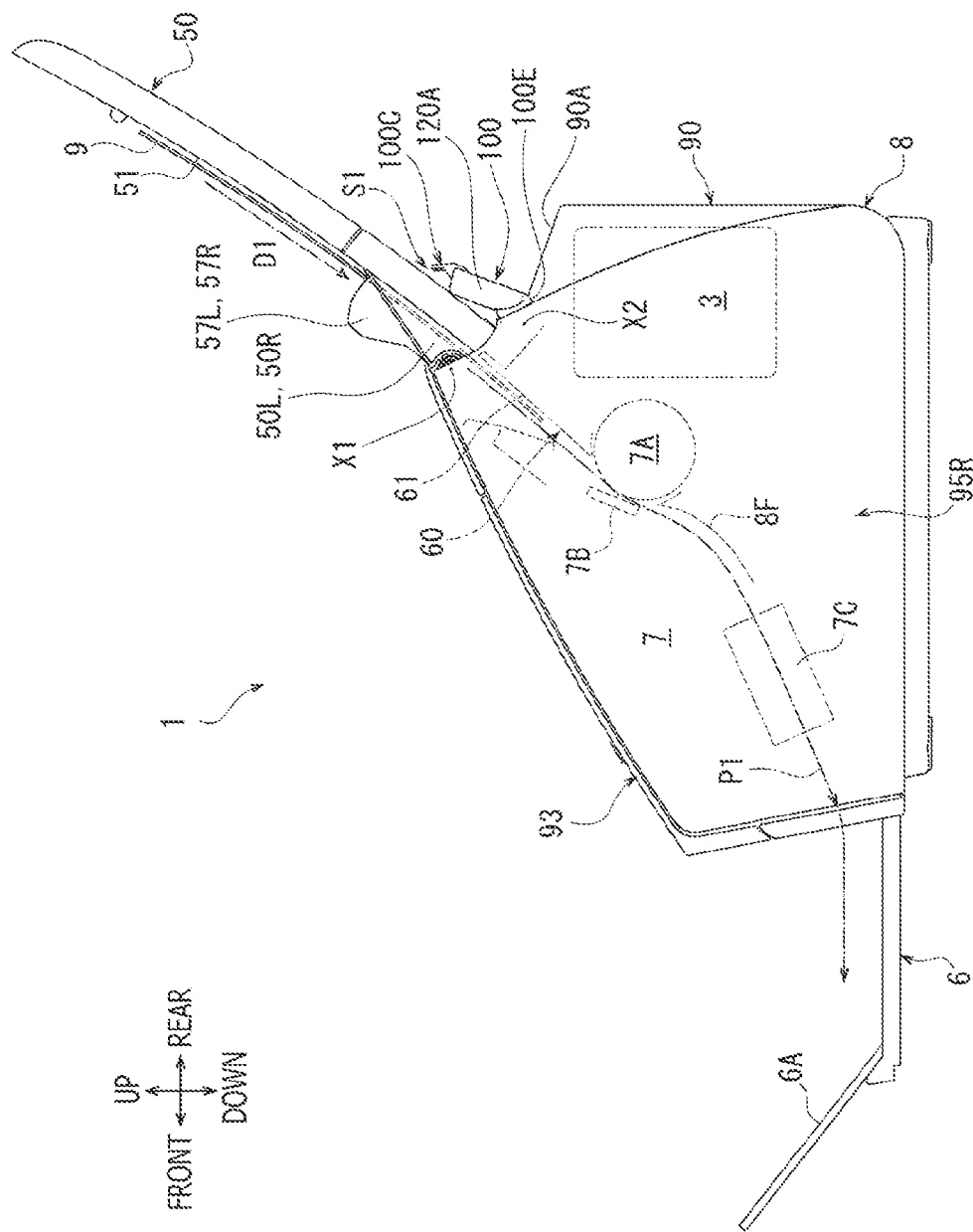
FIG. 5 is a side view of the image reader in the state where the feed tray is in the open position in the embodiment according to one or more aspects of the disclosure.
Figure 6:
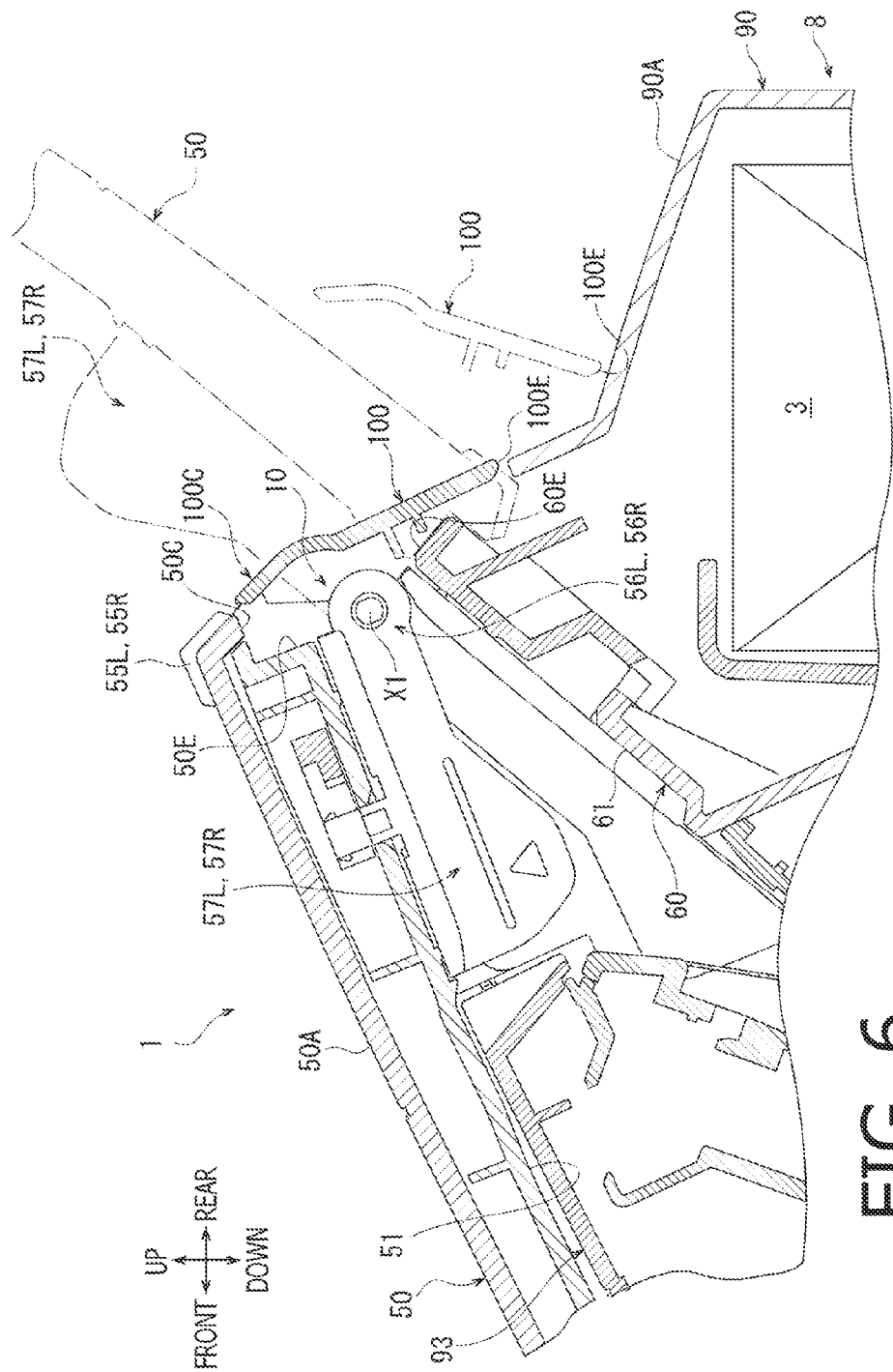
FIG. 6 is an enlarged cross-sectional side view showing a configuration of a region around an opening cover of the image reader in the embodiment according to one or more aspects of the disclosure.

As shown in FIGS. 1 to 5, the image reader 1 includes a housing 8, a feed tray 50, and a catch tray 6. In addition, as shown in FIGS. 5 and 6, the image reader 1 further includes a power supply unit 3 and a reading unit 7.

The housing 8 is a box-shaped body including an upper cover 300, a rear cover 90, a left-side cover 95L, a right-side cover 95R (see FIGS. 1 to 3), and an inner frame 8F (see FIG. 4).

As shown in FIGS. 1 to 3, and 5, the upper cover 93 is generally slanted up toward the rear side thereof. Meanwhile, as shown in FIG. 4, to fix a paper jam or do maintenance, the upper cover 93 is swung such that the rear end thereof is lifted up. Thereby, an upper wall 8C of the inner frame 8F of the housing 8 and a feed roller 7A are exposed to the outside.

The feed tray 50 is formed in a flat plate shape of which one surface serves as the loading surface 51. Further, the feed tray 50 includes two hinges 50L and 50R, which are formed at a left corner and a right corner of the feed tray 50, respectively, integrally with the feed tray 50. The feed tray 50 is supported by the housing 8 via the hinges 50L and 50R, to be swingable around a first swing axis X1 that is located at an upper rear side of the housing 8 and extends in the left-to-right direction.

Figure 1:
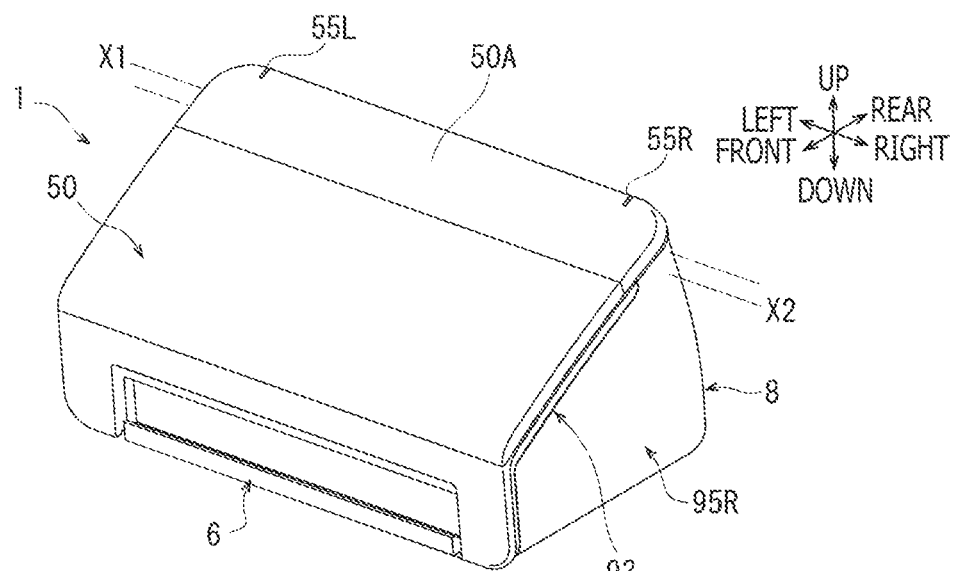
FIG. 1 is a perspective view mainly showing a front side of an image reader in an embodiment according to one or more aspects of the disclosure.
Figure 2:
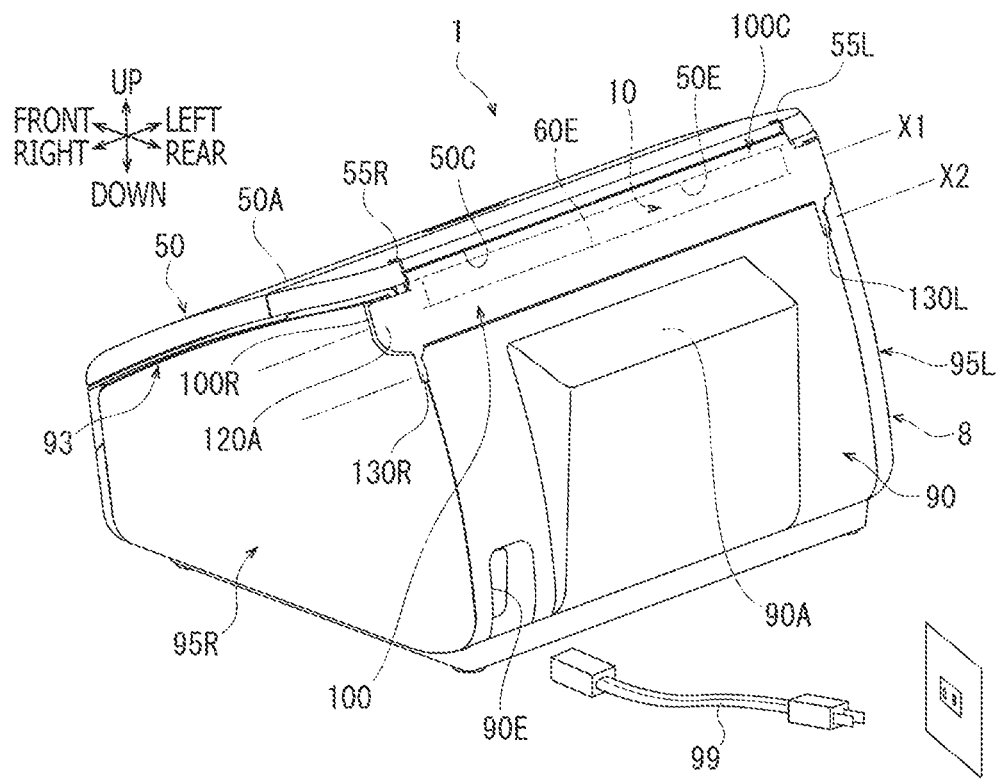
FIG. 2 is a perspective view mainly showing a rear side of the image reader in a state where a feed tray is in a closed position in the embodiment according to one or more aspects of the disclosure.

As shown in FIGS. 1, 2, and 6, the feed tray 50 is configured to, when closed, cover the housing 8 from above with the loading surface 51 directed downward. Hereinafter, the position of the feed tray 50 shown in FIGS. 1, 2, and 6 will be referred to as a "closed position."

Further, when opened, the feed tray 50 is swung around the first swing axis X1 from the state as shown in FIG. 1. Through the swing motion, as shown in FIGS. 3 to 5, the feed tray 50 is moved to such a position that the loading surface 51 is directed upward at the rear side of the housing 8. Hereinafter, the position of the feed tray 50 shown in FIGS. 3 to 5 will be referred to as an "open position."

As shown in FIGS. 4 and 5, the upper wall 8C of the inner frame 8F includes a guide surface 61, which is an upper surface of a flat plate portion 60 that extends in a manner slanted down to the feed roller 7A from the rear side of the housing 8. When the feed tray 50 is in the open position, the guide surface 61 and the loading surface 51 form a flat surface. At this time, as shown in FIG. 4, an end 60E of the flat plate portion 60 that is located on a side close to the first swing axis X1 is opposed in proximity to an end 50E of the feed tray 50 that is located on a side close to the first swing axis X1. As shown in FIG. 5, when a sheet 9 is placed on the loading surface 51, the leading end of the sheet 9 is pulled to the guide surface 61 to contact the feed roller 7A.

As shown in FIGS. 5 and 6, the power supply unit 3 is disposed under the first swing axis X1 inside the housing 8. The power supply unit 3 is an AC adapter configured to convert an alternating-current (AC) voltage output from a household wall outlet into a direct-current (DC) voltage and supply the DC voltage to the reading unit 7. The power supply unit 3 is covered from behind with the rear cover 90. The rear cover 90 includes a bulging portion 90A formed to cover the (cuboid) power supply unit 3. The bulging portion 90A protrudes rearward and upward from curved portions formed at left and right sides of the rear cover 90. Further, as shown in FIG. 2, the rear cover 90 includes a connection hole 90E, into which an end of a power cable 99 for electrically connecting the power supply unit 3 with the household wall outlet is fitted.

As shown in FIG. 5, the reading unit 7 is attached to the inner frame 8F inside the housing 8. The reading unit 7 includes the feed roller 7A, a separation pad 7B, an image reading sensor 7C, and an ejection roller (not shown). The reading unit 7 is configured to feed the sheet 9 placed on the loading surface 51 forward along a feeding path P1 that extends in a manner slanted down forward. Further, the reading unit 7 is configured to read an image of the sheet 9 with the image reading sensor 7C in the middle of the feeding path P1. As the image reading sensor 7C, various types of sensors such as a contact image sensor (CIS) and a charge coupled device (CCD) may be employed. When including two image reading sensors facing each other across the feeding path P1, the reading unit 7 is allowed to perform double-side reading to read images of both sides of the sheet 9.

As shown in FIGS. 1 and 5, the catch tray 6 is configured to be drawn from and inserted into the housing 8. As shown in FIG. 1, when the catch tray 6 is housed inside the housing 8, a front end face of the catch tray 6 is exposed to the outside. When the catch tray 6 is drawn from the housing 8, the catch tray 6 is put into a state where a catch surface 6A is directed upward in front of the housing 8, as shown in FIG. 5.

When the sheet 9 of which the image has been read by the reading unit 7 is further conveyed along the feeding path P1, the sheet 9 is ejected onto the catch surface 6A. When a plurality of sheets 9 are placed on the loading surface 51, the sheets 9 are fed along the feeding path P1 on a sheet-by-sheet basis. Then, after images of the sheets 9 are read by the reading unit 7, the sheets 9 are sequentially ejected onto and stacked on the catch surface 6A.

As shown in FIGS. 2, and 6, when the feed tray 50 is swung from the open position to the closed position, the end 60E of the flat plate portion 60 on the side close to the first swing axis X1 is separated in the vertical direction from the end 50E of the feed tray 50 on the side close to the first swing axis X1, so as to form an opening 10.

Further, as shown in FIGS. 2 and 3, the image reader 1 is provided with an opening cover 100. The opening cover 100 is a flat-plate-shaped resin member elongated in the width direction. The opening cover 100 is disposed above the rear cover 90. As shown in FIG. 2, the opening cover 100 includes a left hinge 130L and a right hinge 130R. A lower end of the left hinge 130L protrudes downward to be adjacent to an upper left corner of the rear cover 90, and gets into the housing 8. In the same manner, a lower end of the right hinge 130R protrudes downward to be adjacent to an upper right corner of the rear cover 90, and gets into the housing 8.

Figure 7:
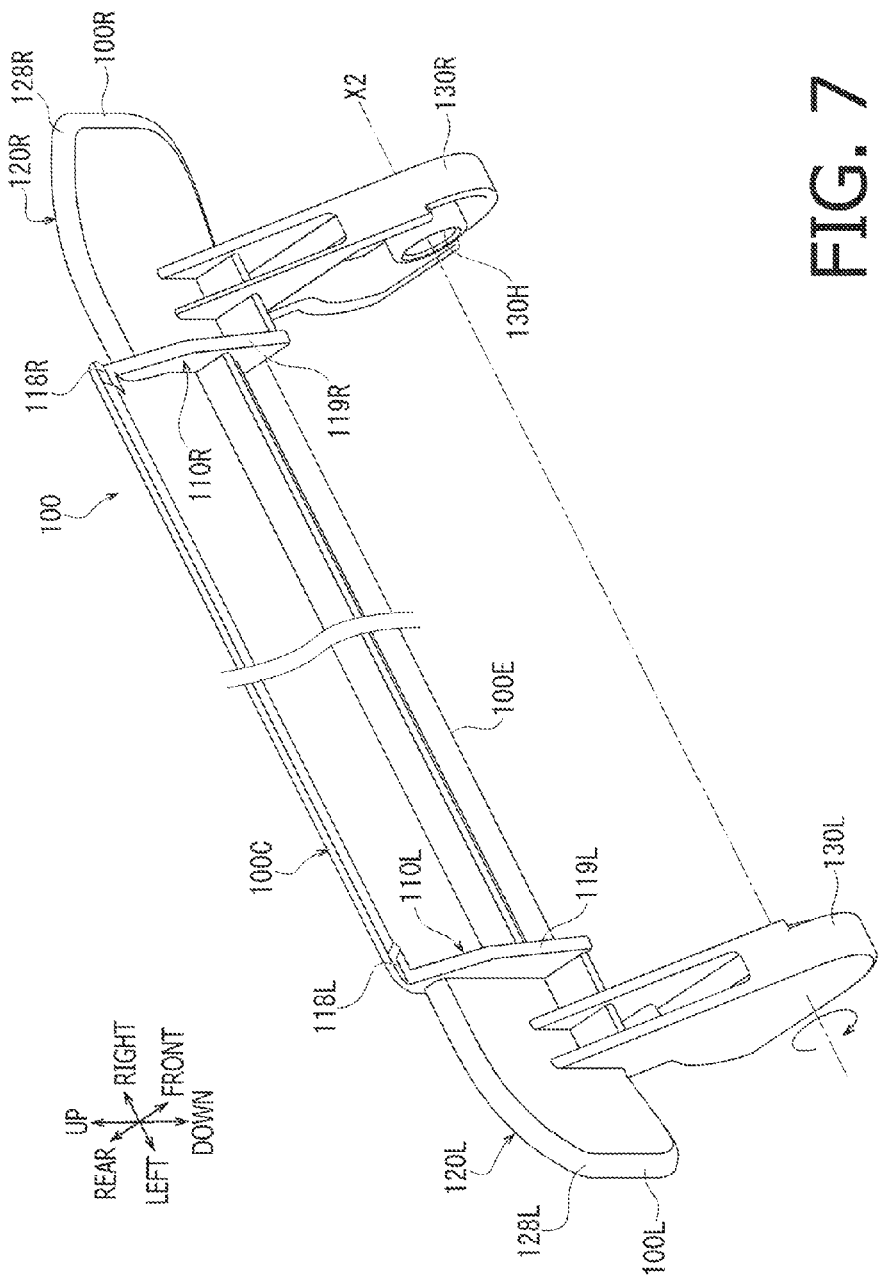
FIG. 7 is a perspective view mainly showing a front side of the opening cover in the embodiment according to one or more aspects of the disclosure.

As shown in FIG. 7, at respective lower ends of the two hinges 130L and 130R, there are shaft holes 130H formed to be recessed along the left-to-right direction. It is noted that FIG. 7 shows only the right shaft hole 130H. The shaft holes 130H of the two hinges 130L and 130R are rotatably supported by a shaft (not shown) provided in the housing 8. Thereby, the opening cover 100 is supported by the inner frame 8F of the housing 8 to be swingable around a second swing axis X2, which is parallel to and disposed lower than the first swing axis X1.

Between the inner frame 8F (see FIG. 4) of the housing 8 and each of the hinges 130L and 130R, an urging spring (not shown) is provided to apply an urging force to make the opening cover 100 swing forward.

As shown in FIGS. 2 and 6, when the feed tray 50 is swung to the closed position, the opening cover 100 is urged by the urging springs and swung forward around the second swing axis X2 to cover the opening 10. As will be described in detail later, the opening cover 100 is swung rearward around the second swing axis X2 while resisting the urging force from the urging spring in conjunction with the feed tray 50 being swung to the open position. Thereby, as shown in FIGS. 3 and 5, the opening cover 100 evacuates under the feed tray 50.

As shown in FIG. 6, the bulging portion 90A of the rear cover 90 is provided in such a position as to contact a lower end 100E of the opening cover 100 which is further swung from a position thereof in the state where the feed tray 50 is in the open position (see a chain double-dashed line in FIG. 6).

In the embodiment, as shown in FIG. 4, the width direction of the sheet 9 to be fed along the feeding direction D1 is the left-to-right direction. The first swing axis X1 and the second swing axis X2 are parallel to the left-to-right direction. It is noted that "parallel" means "substantially parallel." Further, in the following descriptions, "perpendicular" will mean "substantially perpendicular" as well.

Further, as shown in FIG. 4, the image reader 1 includes two width regulating guides 57L and 57R. Each of the two width regulating guides 57L and 57R is formed in a rib shape to extend from a position on the loading surface 51 to a position on the guide surface 61 in parallel with the feeding direction D1. The width regulating guides 57L and 57R include joining sections 56L and 56R, respectively, in the middle thereof in the feeding direction D1. As shown in FIGS. 4 and 6, when the feed tray 50 is swung to the closed position or the open position, the joining sections 56L and 56R allow the width regulating guides 57L and 57R to be bent or straightened around the first swing axis X1.

The sheet 9 placed on the loading surface 51 is positioned in the width direction when the width regulating guides 57L and 57R are made close to or separated from each other in the width direction on the basis of the center therebetween in the width direction. Thereby, the image reader 1 is allowed to read an image formed on a sheet having any of various sizes, e.g., from the name card size to the A4 size.

<Specific Configuration to Swing Opening Cover in Conjunction with Swing Motion of Feed Tray>

As shown in FIG. 7, the opening cover 100 includes first sliding contact portions 110L and 110R, and second sliding contact portions 120L and 120R. It is noted that the opening cover 100 is formed to be bilaterally symmetric. FIGS. 8 to 13 show a right rear side of the image reader 1. A left rear side of the image reader 1 is configured in the same manner as shown in FIGS. 8 to 13. Hereinafter, for instance, the first sliding contact portion 110L, which is not shown in FIG. 8, will be described at the same time when the first sliding portion 110R will be described with reference to FIG. 8.

The first sliding contact portions 110L and 110R are disposed in a middle section 100C of the opening cover 100 in the width direction. Meanwhile, the second sliding contact portions 120L and 120R are disposed at a left end 100L and a right end 100R of the opening cover 100 in the width direction, respectively.

Here, the middle section 100C of the opening cover 100 in the width direction is not limited to a center of the opening cover 100 in the width direction but includes a region between the left end 100L and the right end 100R of the opening cover 100 in the width direction. More specifically, in the embodiment, the middle section 100C represents a region pinched between the two hinges 130L and 130R in the width direction. Further, in the embodiment, the second sliding contact portion 120L at the left side represents a region extending leftward from the left hinge 130L. The second sliding contact portion 120R at the right side represents a region extending rightward from the right hinge 130R.

As shown in FIG. 7, the middle section 100C extends upward to a higher position than upper ends of the second sliding contact portions 120L and 120R. When the feed tray 50 is in the closed position, the middle section 100C gets into a recessed portion 50C (see FIG. 8) provided at the end 50E of the feed tray 50 on the side close to the first swing axis X1.

As shown in FIG. 7, a surface of the middle section 100C that faces the inside of the housing 8 includes a left rib 119L and a right rib 119R formed to extend downward from a left-side upper end corner 118L and a right-side upper end corner 118R, respectively. Top surfaces of the two ribs 119L and 119R are bent such that intermediate portions thereof in the vertical direction protrude forward. The first sliding contact portion 110L includes the left-side upper end corner 118L and the left rib 119L. The first sliding contact portion 110R includes the right-side upper end corner 118R and the right rib 119R.

Figure 8:
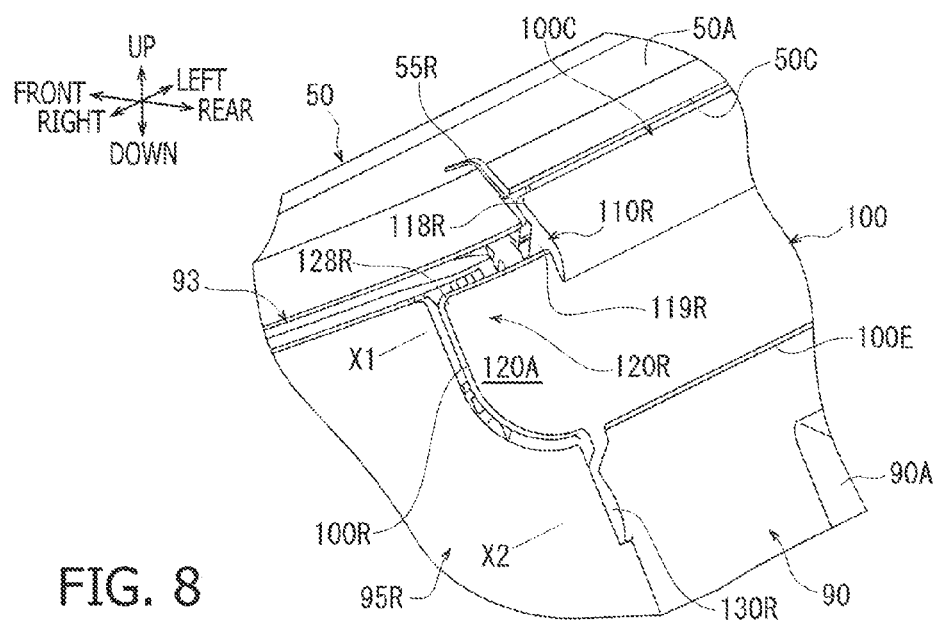
FIG. 8 is an enlarged perspective view mainly showing a region around the opening cover in the state where the feed tray is in the closed position in the embodiment according to one or more aspects of the disclosure.

As shown in FIG. 8, upper rear corners of the left-side cover 95L and the right-side cover 95R are cut out. The second sliding contact portions 120L and 120R extend forward (in a direction perpendicular to the width direction) in a curved manner, and fit in the cutouts of the left-side cover 95L and the right-side cover 95R, respectively. In the state where the feed tray 50 is in the closed position, when the housing 8 is viewed along the width direction from the outside, curved surfaces 120A, which face outward, of the second sliding contact portions 120L and 120R are exposed to the outside, so as to form designing surfaces continuous with the left-side cover 95L and the right-side cover 95R, respectively.

As shown in FIG. 8, an outer surface 50A of the feed tray 50 opposite to the loading surface 51 is provided with third sliding contact portions 55L and 55R. The third sliding contact portions 55L and 55R are short ribs protruding from the outer surface 50A. As shown in FIG. 14A, the third sliding contact portions 55L and 55R are disposed at a side of the outer surface 50A that is close to the first swing axis X1, above the upper end corners 118L and 118R of the first sliding contact portions 110L and 110R, respectively. The third sliding contact portions 55L and 55R extend short rearward, then bend, and further extend short downward so as to become closer to the upper end corners 118L and 118R, respectively.

Subsequently, referring to FIGS. 8 to 15, a detailed explanation will be provided about an operation of the opening cover 100 in conjunction with the swing motion of the feed tray 50.

Figure 9:
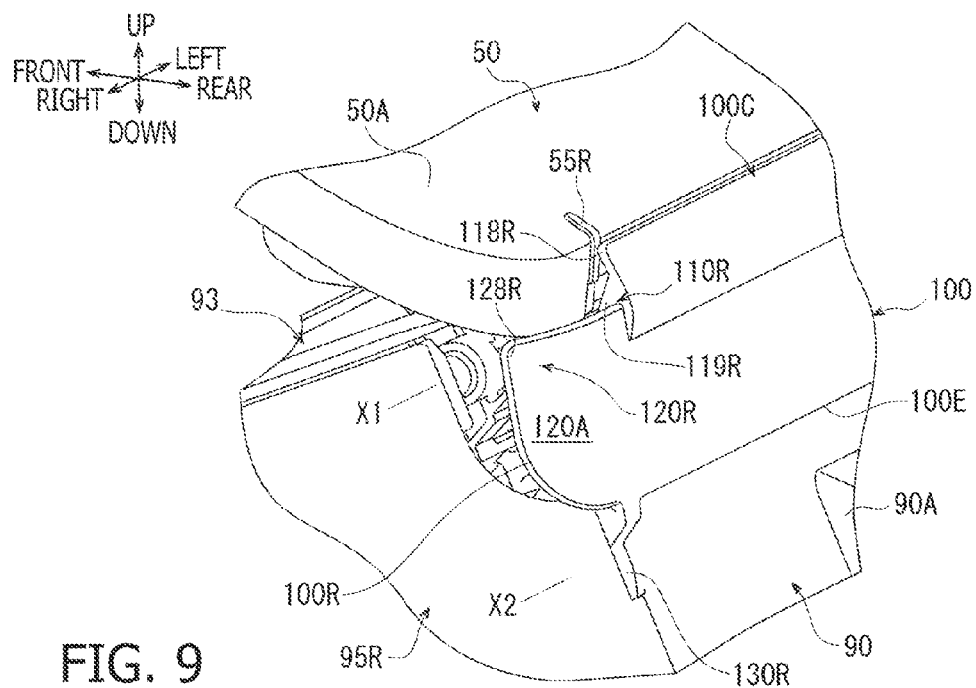
FIG. 9 is an enlarged perspective view mainly showing the region around the opening cover in a state where the feed tray is slightly swung from the closed position (in an earlier process of a swing motion of the feed tray from the closed position to the open position) in the embodiment according to one or more aspects of the disclosure.

As shown in FIGS. 8 and 14A, when the feed tray 50 in the closed position is opened by a user, the feed tray 50 begins to swing around the first swing axis X1. Then, as shown in FIGS. 9 and 14B, the upper end corners 118L and 118R of the first sliding contact portions 110L and 110R run upon and slide in contact with the third sliding contact portions 55L and 55R, respectively. Thereby, the opening cover 100 begins to swing rearward around the second swing axis X2.

Figure 10:
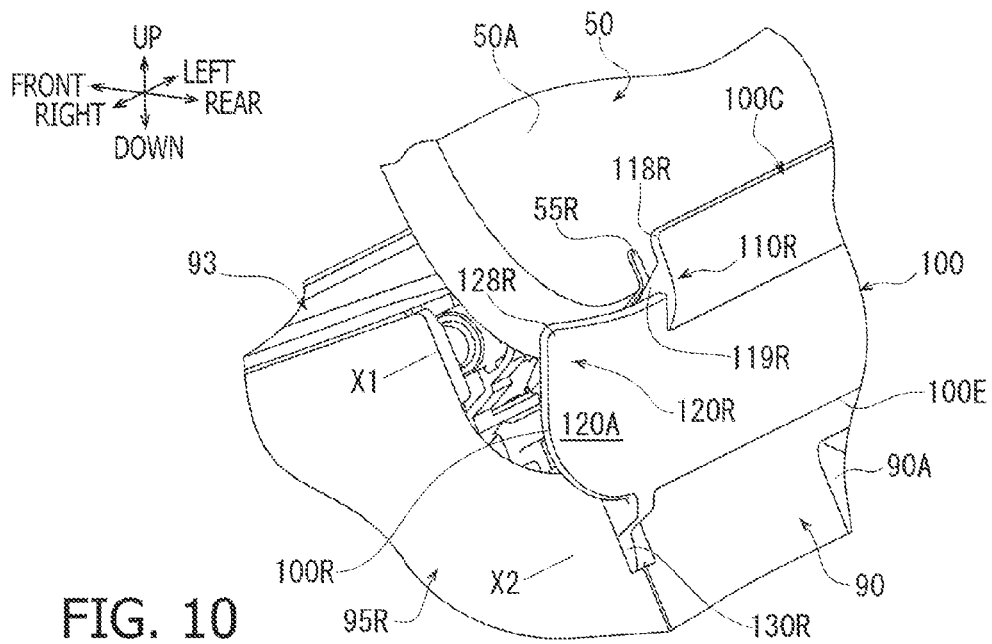
FIG. 10 is an enlarged perspective view mainly showing the region around the opening cover in a state where the feed tray is further swung from the position shown in FIG. 9 (in the earlier process of the swing motion of the feed tray from the closed position to the open position) in the embodiment according to one or more aspects of the disclosure.

Subsequently, as shown in FIGS. 10 and 14C, when the feed tray 50 is further swung, the top surfaces of the ribs 119L and 119R of the first sliding contact portions 110L and 110R slide on the third sliding contact portions 55L and 55R, respectively. Thereby, the opening cover 100 is further swung rearward.

Figure 11:
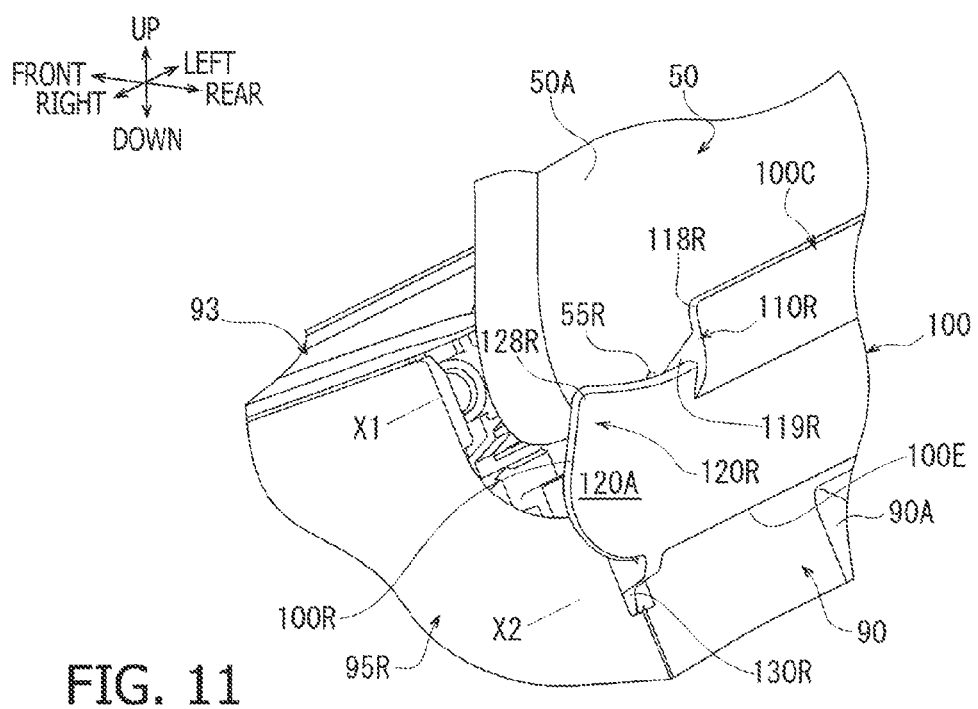
FIG. 11 is an enlarged perspective view mainly showing the region around the opening cover in a state where the feed tray is further swung from the position shown in FIG. 10 (in a later process of the swing motion of the feed tray from the closed position to the open position) in the embodiment according to one or more aspects of the disclosure.
Figures 15A, 15B, 15C:
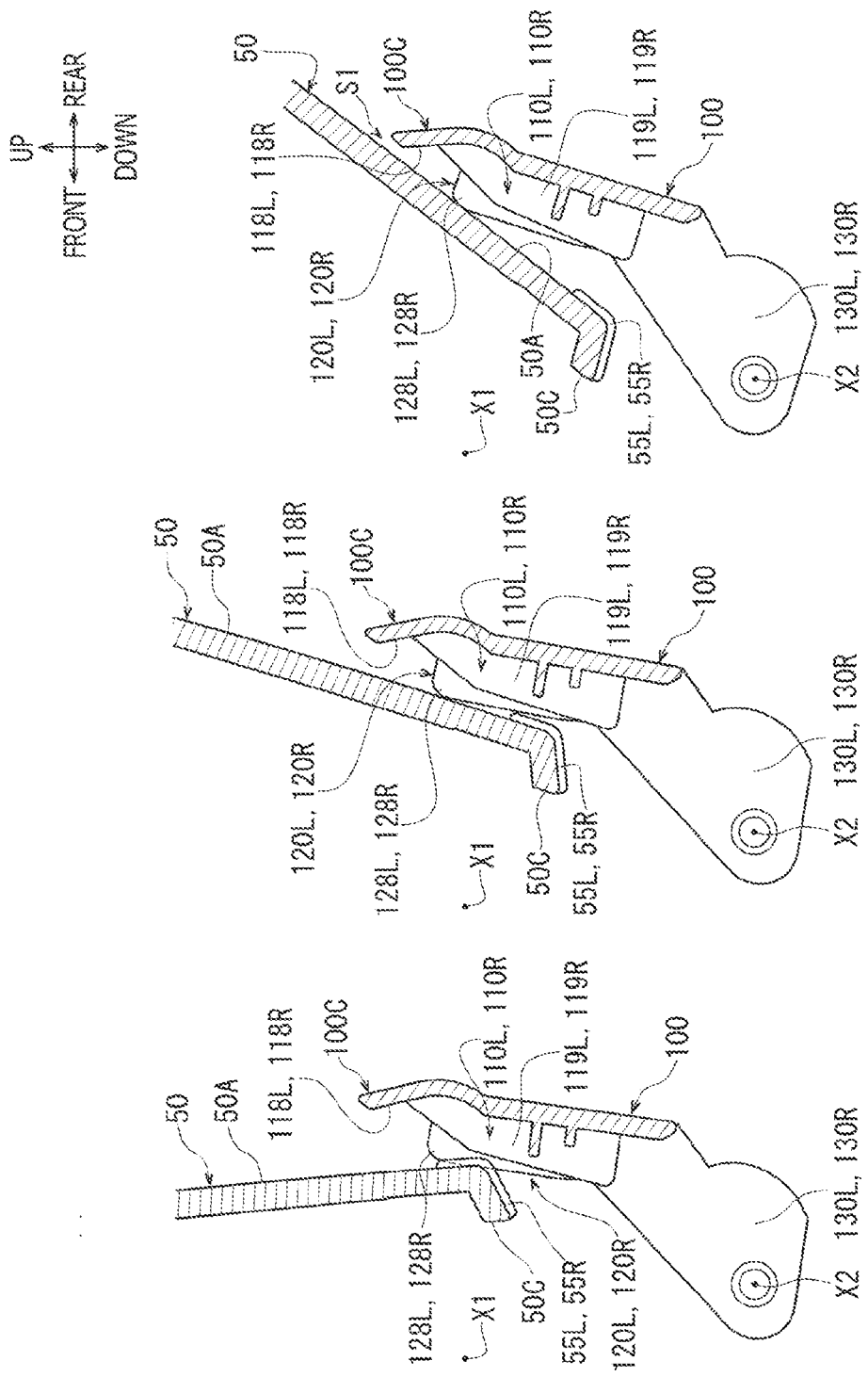
FIG. 15A is a cross-sectional side view schematically showing the region around the opening cover in the state shown in FIG. 11 in the embodiment according to one or more aspects of the disclosure.
FIG. 15B is a cross-sectional side view schematically showing the region around the opening cover in the state shown in FIG. 12 in the embodiment according to one or more aspects of the disclosure.
FIG. 15C is a cross-sectional side view schematically showing the region around the opening cover in the state shown in FIG. 13 in the embodiment according to one or more aspects of the disclosure.

Next, as shown in FIGS. 11 and 15A, when the feed tray 50 is further swung, the second sliding contact portions 120L and 120R run upon the outer surface 50A of the feed tray 50, such that the top surfaces of the ribs 119L and 119R of the first sliding contact portions 110L and 110R are separated from the third sliding contact portions 55L and 55R.

Figure 12:
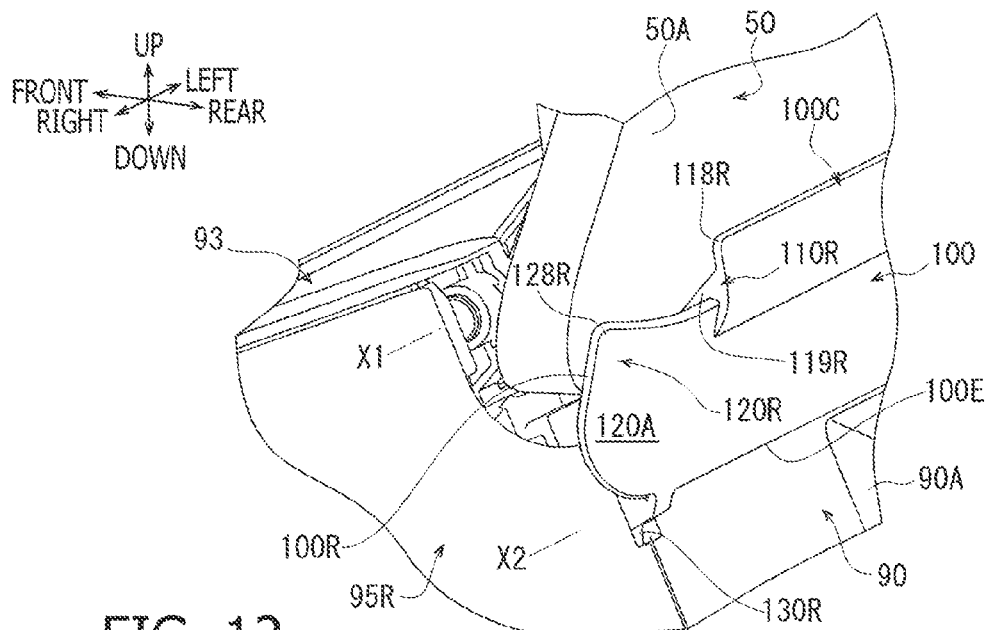
FIG. 12 is an enlarged perspective view mainly showing the region around the opening cover in a state where the feed tray is further swung from the position shown in FIG. 11 (in the later process of the swing motion of the feed tray from the closed position to the open position) in the embodiment according to one or more aspects of the disclosure.

Next, as shown in FIGS. 12 and 15B, when the feed tray 50 is further swung, upper end corners 128L and 128R of the second sliding contact portions 120L and 120R slide on the outer surface 50A of the feed tray 50. Thereby, the opening cover 100 is further swung rearward.

Figure 13:
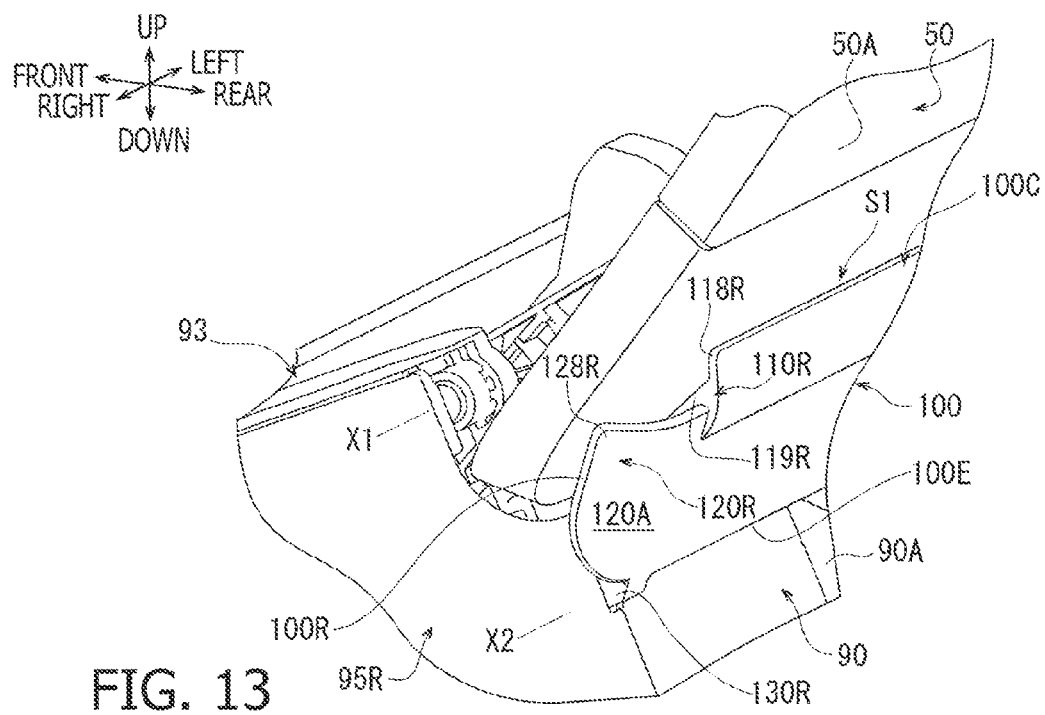
FIG. 13 is an enlarged perspective view mainly showing the region around the opening cover in the state where the feed tray is in the open position in the embodiment according to one or more aspects of the disclosure.

Thus, as shown in FIGS. 13 and 15C, when the feed tray 50 is swung to the open position, the upper end corners 128L and 128R of the second sliding contact portions 120L and 120R are in contact with the outer surface 50A of the feed tray 50 to hold the posture of the opening cover 100. At this time, the upper end of the middle section 100C of the opening cover 100 is separated from the feed tray 50, so as to form a gap S1. It is noted that, in order to form the gap S1, the upper end of the middle section 100C of the opening cover 100 has only to be separated from the feed tray 50 at least partially in the width direction. In other words, the upper end of the middle section 100C of the opening cover 100 is not required to be separated from the feed tray 50 over the entire length thereof in the width direction.

In the aforementioned series of operations, by the urging force from the urging spring (not shown) configured to urge the opening cover 100 forward, the first sliding contact portions 110L and 110R are pressed against the third sliding contact portions 55L and 55R, respectively, and the second sliding contact portions 120L and 120R are pressed against the outer surface 50A.

Meanwhile, when the feed tray 50 in the open position is closed by the user, in accordance with a procedure opposite to the aforementioned operational procedure, the second sliding contact portions 120L and 120R slide on the outer surface 50A of the feed tray 50 in the reverse direction, and the first sliding contact portions 110L and 110R respectively slide on the third sliding contact portions 55L and 55R in the reverse direction. Consequently, the opening cover 100, which is urged by the urging spring (not shown), is swung forward to cover the opening 10.

<Operations and Effectiveness>

In the image reader 1 of the embodiment, the second sliding contact portions 120L and 120R provided at the both ends 100L and 100R in the width direction extend in a curved manner in a direction perpendicular to the width direction, namely, forward. Further, the curved surfaces 120A of the second sliding contact portions 120L and 120R are exposed to the outside. Therefore, the image reader 1 does not need any space provided inside the housing 8 to accommodate the second sliding contact portions 120L and 120R. Thus, according to the embodiment, it is possible to lessen the width of the image reader 1 and downsize the image reader 1, compared with such an image reader that sliding contact portions (such as the second sliding contact portions 120L and 120R) for swinging an opening cover in conjunction with a swing motion of a feed tray are covered with exterior parts (such as side covers) and housed in a housing.

Further, according to the image reader 1, when the feed tray 50 is in the closed position, the second sliding contact portions 120L and 120R, the curved surfaces 120A, and the side covers 95L and 95R form designing surfaces for the side faces of the image reader 1.

Further, according to the image reader 1, the second sliding contact portions 120L and 120R are allowed to evenly hold the posture of the opening cover 100 at the both ends 100L and 100R of the opening cover 100 in the width direction, respectively. Therefore, the image reader 1 is allowed to prevent distortion of the opening cover 100 better than an image reader including a second sliding contact portion at only one of the sides in the width direction. Hence, it is possible to render the opening cover 100 thinner.

Further, according to the image reader 1, the middle section 100C of the opening cover 100 gets into the recessed portion 50C of the feed tray 50 in the closed state. Thereby, it is possible to easily put the first sliding contact portions 110L and 110R closer to the feed tray 50. Thus, it is possible to make the first sliding contact portions 110L and 110R slide in contact with the feed tray 50 earlier than the second sliding contact portions 120L and 120R.

Further, according to the image reader 1, areas of the feed tray 50 with which the first sliding contact portions 110L and 110R slide in contact are limited to the third sliding contact portions 55L and 55R. Thus, tracks of sliding contact therebetween are hard to notice.

Further, according to the image reader 1, as shown in FIGS. 5, 13, and 15C, it is possible to transfer exhaust heat from the power supply unit 3 to the outside of the housing 8 through the gap S1, which is formed when the opening cover 100 is separated from the feed tray 50 in the open position. Consequently, it is possible to prevent high temperature inside the housing 8 and thus avoid occurrence of an operational failure of the reading unit 7.

Further, according to the image reader 1, as indicated by the chain double-dashed line in FIG. 6, the bulging portion 90A of the rear cover 90 is provided in such a position as to contact the lower end 100E of the opening cover 100 which is further swung from the position of the opening cover 100 in the case where the feed tray 50 is in the open position. Hence, the bulging portion 90A limits a swing range of the opening cover 100. Therefore, the image reader 1 prevents the opening cover 100 from excessively swinging to be broken and prevents the urging spring for urging the opening cover 100 from being overstretched. Additionally, the bulging portion 90A doubles as a stopper that contacts the opening cover 100 excessively swung. Thus, it is possible to achieve a more simplified configuration of the image reader 1 than when a stopper is separately provided.

Hereinabove, the embodiment according to aspects of the disclosure has been described. The disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the disclosure. However, it should be recognized that the disclosure can be practiced without reapportioning to the details specifically set forth. In other instances, well known processing structures have not been described in detail, in order not to unnecessarily obscure the disclosure.

Only an exemplary embodiment of the disclosure and but a few examples of their versatility are shown and described in the disclosure. It is to be understood that the disclosure is capable of use in various other combinations and environments and is capable of changes or modifications within the scope of the inventive concept as expressed herein. For example, the following modifications are possible.

(Modifications)

The shape of the left end 100L of the opening cover 100 may be changed from that exemplified in the aforementioned embodiment such that the left end 100L does not slide in contact with the feed tray 50 even when the feed tray 50 is swung. In this case, the shape of the right end 100R of the opening cover 100 may be maintained as is exemplified in the aforementioned embodiment. Alternatively, the shape of the right end 100R may be changed from that exemplified in the aforementioned embodiment such that the right end 100R does not slide in contact with the feed tray 50 even when the feed tray 50 is swung. In this case, the shape of the left end 100L may be maintained as is exemplified in the aforementioned embodiment.

The reading unit 7 may be replaced with an image forming unit configured to form an image on a sheet.

The first sliding contact portions 110L and 110R, the second sliding contact portions 120L and 120R, and the third sliding contact portions 55L and 55R are not limited to those having the respective shapes exemplified in the aforementioned embodiment. For example, they may be protruding portions formed in a block shape or a hemispherical shape. Further, the first sliding contact portions 110L and 110R and the second sliding contact portions 120L and 120R are not limited to those formed integrally with the opening cover 100 as exemplified in the aforementioned embodiment. They may be formed to be separate from the opening cover 100 and attached to the opening cover 100. Furthermore, the third sliding contact portions 55L and 55R may be formed to be separate from the feed tray 50 and attached to the feed tray 50.

In the aforementioned embodiment, the third sliding contact portions 55L and 55R are provided on a surface of the feed tray 50 that faces the opening cover 100. However, the third sliding contact portions 55L and 55R may be provided on a surface of the opening cover 100 that faces the feed tray 50. Further, the third sliding contact portions 55L and 55R are not limited to rib-shaped ones exemplified in the aforementioned embodiment. For instance, the third sliding contact portions 55L and 55R may be anti-friction resin sheets attached onto the feed tray 50 or the opening cover 100, which sheets achieve lower frictional resistance than the surfaces of the feed tray 50 and the opening cover 100. In the aforementioned embodiment, the third sliding contact portions 55L and 55R are provided on the left and right sides of the feed tray 50, respectively. However, for instance, only a single third sliding contact portion may be provided on a central surface of the feed tray 50 that faces the opening cover 100. Alternatively, only a single third sliding contact portion may be provided on a central surface of the opening cover 100 that faces the feed tray 50. Furthermore, third sliding contact portions may be provided at left and right sides on a surface of the opening cover 100 that faces the feed tray 50.

What is claimed is:

1. A sheet feeder comprising:
   a housing;
   a feed tray comprising a loading surface configured such that a sheet to be fed into the housing along a feeding direction are placed thereon, the feed tray being formed in a flat plate shape and configured to swing around a first swing axis parallel to a width direction of the sheet between a first position where the loading surface is directed downward above the housing and a second position where the loading surface is directed upward at an upstream side relative to the housing in the feeding direction;
   an opening formed by an end of the housing on a side close to the first swing axis being separated from an end of the feed tray on a side close to the first swing axis in a state where the feed tray is in the first position; and
   an opening cover configured to swing around a second swing axis parallel to the first swing axis, the opening cover being configured to cover the opening when the feed tray is in the first position, the opening cover comprising:
      a sliding contact portion disposed on at least one of ends of the opening cover in the width direction, the sliding contact portion extending in a direction perpendicular to the width direction, the sliding contact portion being exposed to an outside of the sheet feeder when the feed tray is in the first position, the sliding contact portion being configured to slide in contact with the feed tray in a swing motion of the feed tray from the first position to the second position, wherein the opening cover comprises a middle section provided at a central region of the opening cover in the width direction, and wherein the sliding contact portion comprises:
- a first sliding contact portion disposed at the middle section, the first sliding contact portion being configured to slide in contact with the feed tray in an earlier process of the swing motion of the feed tray from the first position to the second position; and
- a second sliding contact portion disposed on at least one of the ends of the opening cover in the width direction, the second sliding contact portion extending in the direction perpendicular to the width direction, the second sliding contact portion being exposed to the outside of the sheet feeder when the feed tray is in the first position, the second sliding contact portion being configured to slide in contact with the feed tray in a later process of the swing motion of the feed tray from the first position to the second position.

2. The sheet feeder according to claim 1, wherein the second sliding contact portion is provided on each end of the opening cover in the width direction.

3. The sheet feeder according to claim 1,
wherein the feed tray comprises a recessed portion provided at the end of the feed tray on the side close to the first swing axis,
wherein the middle section of the opening cover in the width direction extends to a higher position than the second sliding contact portion, and
wherein the middle section of the opening cover in the width direction is configured to get into the recessed portion of the feed tray which is in the first position.

4. The sheet feeder according to claim 1, wherein the feed tray comprises a third sliding contact portion provided on a surface of the feed tray that faces the opening cover, the third sliding contact portion protruding toward the first sliding contact portion, the third sliding contact portion being configured to slide in contact with the first sliding contact portion.

5. The sheet feeder according to claim 1, further comprising:
- a processing unit disposed inside the housing, the processing unit being configured to perform a predetermined process for the sheet to be fed along a feeding path.

6. The sheet feeder according to claim 5, wherein the processing unit is configured to read an image of the sheet being fed along the feeding path.

7. The sheet feeder according to claim 5, further comprising:
- a power supply unit disposed under the first swing axis inside the housing, the power supply unit being configured to supply electricity to the processing unit; and
- a gap formed by the opening cover being separated from the feed tray in a state where the feed tray is in the second position.

8. The sheet feeder according to claim 7,
wherein the housing comprises an exterior cover configured to cover the power Supply unit, and
wherein the exterior cover is disposed in such a position as to contact the opening cover which is further swung from a position thereof in the state where the feed tray is in the second position.

9. A sheet feeder comprising:
a housing;
a feed tray comprising a loading surface configured to support a sheet placed thereon, the feed tray being formed in a flat plate shape and configured to swing around a first swing axis parallel to a fist direction of the sheet between a first position where the loading surface is directed downward above the housing and second position where the loading surface is directed upward at an upstream side relative to the housing in a sheet feeding direction; and
an opening cover configured to swing around a second swing axis parallel to the first swing axis, the opening cover being configured to cover an opening when the feed tray is in the first position, the opening being formed by an end of the housing on a side close to the first swing axis being separated from an end of the feed tray on a side close to the first swing axis in a state where the feed tray is in the first position, the opening cover comprising:
- a middle section provided at a central region of the opening cover in the first direction; and
- a sliding contact portion comprising:
  - a first sliding contact portion disposed at the middle section, the first sliding contact portion extending in a second direction, the first sliding contact portion being configured to slide in contact with the feed tray in an earlier process of a swing motion of the feed tray from the first position to the second position, the second direction being perpendicular to the first direction; and
  - a second sliding contact portion disposed closer to at least one of ends of the opening cover in the first direction than the first sliding contact portion, the second sliding contact portion extending in the second direction, the second sliding contact portion being configured to slide in contact with the feed tray in a later process of the swing motion of the feed tray from the first position to the second position.

10. The sheet feeder according to claim 9, wherein the second sliding contact portion is disposed on at least one of the ends of the opening cover in the first direction.

11. The sheet feeder according to claim 10, wherein the second sliding contact portion is disposed on each of the ends of the opening cover in the first direction.

12. The sheet feeder according to claim 9, wherein the second sliding contact portion is exposed to an outside of the sheet feeder when the feed tray is in the first position.

* * * * *

UNITED STATES PATENT AND TRADEMARK OFFICE
CERTIFICATE OF CORRECTION

PATENT NO. : 8,746,681 B2  
APPLICATION NO. : 13/431192  
DATED : June 10, 2014  
INVENTOR(S) : Masatsugu Mizuno et al.

Page 1 of 1

It is certified that error appears in the above-identified patent and that said Letters Patent is hereby corrected as shown below:

In the claims

In Column 10, Claim 1, Line 47:
    Please delete "are" and insert --is--

In Column 10, Claim 1, Line 64:
    Please delete "of ends" and insert --of plural ends--

In Column 12, Claim 8, Line 3:
    Please delete "Supply" and insert --supply--

In Column 12, Claim 9, Line 14:
    Please delete "fist" and insert --first--

In Column 12, Claim 9, Line 16:
    Please delete "and" insert --and a--

Signed and Sealed this
Twenty-fourth Day of May, 2016

Michelle K. Lee
*Director of the United States Patent and Trademark Office*